(12) United States Patent
Gregoire et al.

(10) Patent No.: US 10,913,439 B2
(45) Date of Patent: Feb. 9, 2021

(54) VEHICLES AND BRAKING SYSTEMS FOR VEHICLES HAVING A SPRING BRAKE ACTUATOR WITH REPLACEABLE PUSH ROD ASSEMBLY

(71) Applicant: TSE Brakes, Inc., Cullman, AL (US)

(72) Inventors: Jean Gregoire, Blainville (CA); Kok Gaither-Ho, Cullman, AL (US)

(73) Assignee: TSE Brakes, Inc., Cullman, AL (US)

( * ) Notice: Subject to any disclaimer, the term of this patent is extended or adjusted under 35 U.S.C. 154(b) by 57 days.

(21) Appl. No.: 15/937,019

(22) Filed: Mar. 27, 2018

(65) Prior Publication Data
US 2018/0281767 A1    Oct. 4, 2018

Related U.S. Application Data

(60) Provisional application No. 62/477,736, filed on Mar. 28, 2017.

(51) Int. Cl.
*B60T 17/08* (2006.01)
*F16D 65/28* (2006.01)
(Continued)

(52) U.S. Cl.
CPC .......... *B60T 17/083* (2013.01); *B60T 13/385* (2013.01); *B60T 17/085* (2013.01); *B60T 17/088* (2013.01);
(Continued)

(58) Field of Classification Search
CPC .... B60T 17/083; B60T 17/085; B60T 17/088; B60T 13/385; F16D 65/28; F16D 2121/10
See application file for complete search history.

(56) References Cited

U.S. PATENT DOCUMENTS

| 3,020,094 A | 2/1962 | Murty et al. |
| 5,002,164 A * | 3/1991 | Bowyer ................ B60T 17/083 |
| | | 188/1.11 R |

(Continued)

FOREIGN PATENT DOCUMENTS

GB        1492225        11/1977

OTHER PUBLICATIONS

International Preliminary Report on Patentability for PCT/US2018/024736, dated Oct. 10, 2019.
(Continued)

*Primary Examiner* — Vishal R Sahni
(74) *Attorney, Agent, or Firm* — Andrus Intellectual Property Law, LLP

(57) ABSTRACT

A spring brake actuator is for braking a wheel of a vehicle and has a push rod assembly having a base located in a service brake chamber and a push rod extending from a service brake chamber. Pneumatic activation of the spring brake actuator causes the push rod to further extend out of the service brake chamber to thereby engage a wheel brake with a wheel of the vehicle. Pneumatic deactivation of the spring brake actuator causes the push rod to retract back into the service brake chamber to thereby disengage the wheel brake from the wheel of the vehicle. The push rod extends between a first end portion that is fixed to the base and an opposite, second end portion that is removably coupled to the first end portion so that the second end portion is manually attachable and detachable from the push rod assembly.

9 Claims, 9 Drawing Sheets

(51) Int. Cl.
*B60T 13/38* (2006.01)
*F16D 55/00* (2006.01)
*F16D 121/10* (2012.01)
*F16D 125/12* (2012.01)

(52) U.S. Cl.
CPC ...... *F16D 65/28* (2013.01); *F16D 2055/0012* (2013.01); *F16D 2121/10* (2013.01); *F16D 2125/12* (2013.01); *F16D 2250/0084* (2013.01)

(56) References Cited

U.S. PATENT DOCUMENTS

| | | |
|---|---|---|
| 5,957,032 A | 9/1999 | Hicks |
| 6,394,462 B1 | 5/2002 | Constantinides et al. |
| 6,405,635 B1 | 6/2002 | Smith et al. |
| 9,050,958 B2 | 6/2015 | Gaufin |
| 9,297,392 B2 | 3/2016 | Gaufin |
| 2014/0260949 A1 | 9/2014 | Ho et al. |
| 2015/0232077 A1 | 8/2015 | Gaufin |
| 2015/0246667 A1* | 9/2015 | Shimomura ............ F16D 65/28 188/166 |
| 2016/0010711 A1 | 1/2016 | Root et al. |
| 2019/0176793 A1* | 6/2019 | Koelzer ................. B60T 13/38 |

OTHER PUBLICATIONS

International Search Report and Written Opinion, PCT/US2018/024736, dated Jun. 18, 2018.
Extended European Search Report for EP18775539.2, dated Dec. 9, 2020.

\* cited by examiner

VEHICLES AND BRAKING SYSTEMS FOR VEHICLES HAVING A SPRING BRAKE ACTUATOR WITH REPLACEABLE PUSH ROD ASSEMBLY

FIELD

The present disclosure relates to vehicle braking systems, including pneumatically-operated spring brake actuators having a push rod assembly that engages a wheel brake.

BACKGROUND

Heavy trucks, trailers and other commercial vehicles typically use brake systems including pneumatically-operated spring brake actuators that provide the braking forces necessary to stop the vehicle. Such a system typically includes a brake pedal positioned on the floor of the driver's cab or compartment of the vehicle that, upon activation, causes pressurized air from an air reservoir to enter an air chamber of the spring brake actuator. The spring brake actuator features a push rod that is caused to extend out of the air chamber so as to activate a wheel brake having brake shoes with a brake lining material that is pressed against a brake drum at the vehicle wheel-end. The wheel brake often includes a slack adjustor which turns a cam roller via a camshaft so as to force the brake shoes to engage the brake drum so as to stop the vehicle. Releasing the pressurized air from the air chamber allows a spring within the air chamber to retract the push rod back to its original position.

The following U.S. Patent Publications and Patents each disclose conventional examples of the above-summarized pneumatically-actuated spring brake actuators. These documents are incorporated herein by reference in entirety: U.S. Patent Publication No. 2015/0232077; U.S. Patent Publication No. 2014/0260949; U.S. Pat. No. 9,297,392; U.S. Pat. No. 9,050,958; U.S. Pat. No. 6,405,635; and U.S. Pat. No. 6,394,462.

SUMMARY

The present Summary is provided to introduce a selection of concepts that are further described herein below in the Detailed Description. This Summary is not intended to identify key or essential features of the claimed subject matter, nor is it intended to be used as an aid in limiting scope of the claimed subject matter.

In certain non-limiting examples, a pneumatically-activated spring brake actuator is provided for braking a wheel of a vehicle. The spring brake actuator has a parking brake chamber, a service brake chamber, and a push rod assembly having a push rod and a base located in the service brake chamber. The push rod is fixed to the base and extends from the service brake chamber. Pneumatic activation of the spring brake actuator causes the push rod to further extend out of the service brake chamber so as to cause a wheel brake to engage with a wheel of the vehicle, for example via a wheel hub. Pneumatic deactivation of the spring brake actuator causes the push rod to retract back into the service brake chamber to thereby disengage the wheel brake from the wheel of the vehicle. The push rod is an elongated member that has a first end portion that is fixed to the base and an opposite second end portion that is removably coupled to the first end portion so that the second end portion is manually attachable and detachable from the push rod assembly. In certain examples, a support collar is coupled to the push rod and reinforces a joint between the first end portion and second end portion. In certain examples, a mounting bracket couples the spring brake actuator to a vehicle and the push rod extends through the mounting bracket. The joint between the first and second end portions is preferably located along the push rod such that the joint remains outside of the parking brake chamber and also at least partially within an interior of the mounting bracket when the push rod is in the extended position, thus facilitating repair and replacement when the pushrod is inadvertently bent or otherwise damaged, which for example can occur when multiple vehicles are stacked upon each other, all as will be further described herein below.

DETAILED DESCRIPTION OF THE DRAWINGS

Figure 1B:
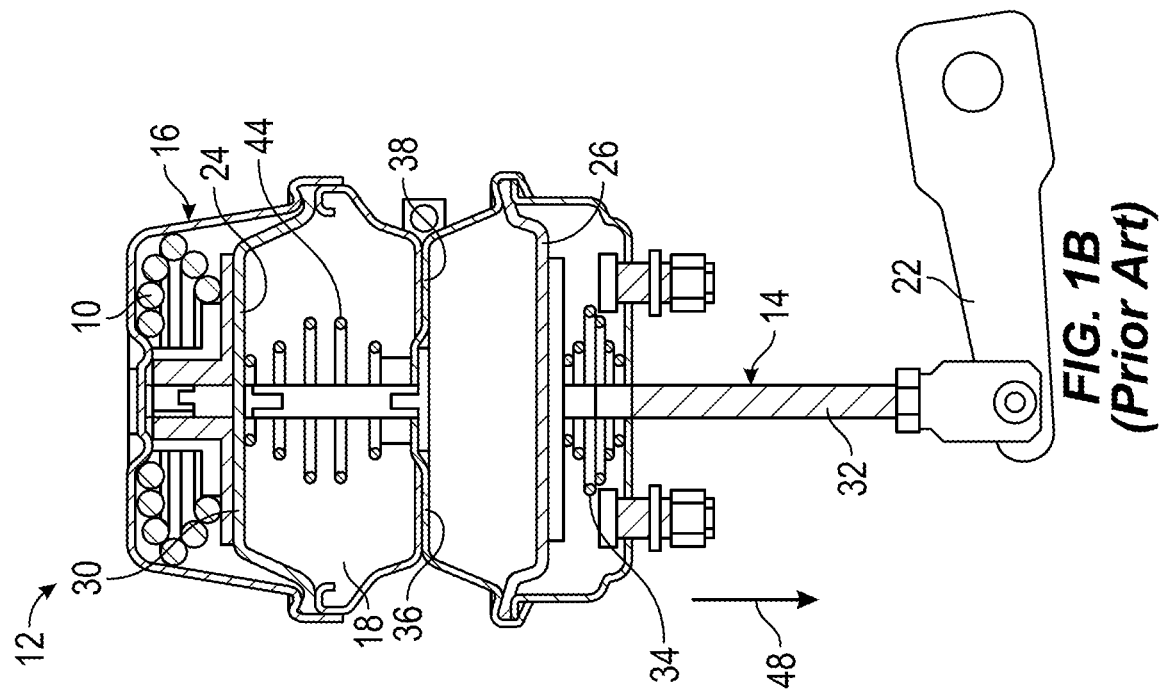
FIGS. 1A-1D are taken from the incorporated U.S. Pat. No. 9,297,392. These figures are cross-sectional views of a prior art spring brake actuator and show the parking brake chamber in a pressurized condition (FIG. 1A), both the parking and service brake chambers in a pressurized condition (FIG. 1B), the main spring engaged (with neither the parking nor the service brake chambers being pressurized) (FIG. 1C), and the main spring mechanically engaged with a release tool (FIG. 1D).

As noted above, FIGS. 1A-1D are cross-sectional views of a prior art spring brake actuator 12. The spring brake actuator 12 includes a push rod assembly 14 and a housing 16 that defines a parking brake chamber 18 and a service brake chamber 20. The bottom end of the push rod assembly 14 is coupled to a lever arm 22 that attaches the push rod assembly 14 to a slack adjustor or a camshaft upon which conventional a cam roller (for actuating the brake shoes) typically is positioned. An upper diaphragm 24 is positioned within the parking brake chamber 18 and a lower diaphragm 26 is positioned in the service brake chamber 20. A main compression spring 10 (also known as a parking spring or a power spring) provides a mechanical means to prevent the vehicle from rolling when there is no air in the system and when the vehicle is stationary or parked. The main compression spring 10 supplies the force needed to extend the push rod assembly 14 in the direction of arrow 48 (FIG. 1B) to thereby engage the wheel brake and hold the vehicle stationary. The main compression spring 10 is positioned between an upper plate 30, which is mounted to the top end of the push rod assembly 14 (FIGS. 1C and 1D) and the upper diaphragm 24, and the top of the housing 16. A lower compression spring 34 is mounted between a lower plate 36, which is mounted to the push rod assembly 14 and the lower diaphragm 26, and the bottom of housing 16. A chamber divider wall 38 is positioned within the housing 16 and separates the parking and service brake chambers 18, 20 and has a central opening 40 (FIG. 1C) through which the push rod 32 extends. An upper compression spring 44 is positioned between the top of the chamber divider wall 38 and the bottom of upper diaphragm 24 and upper plate 30.

Figure 1A:
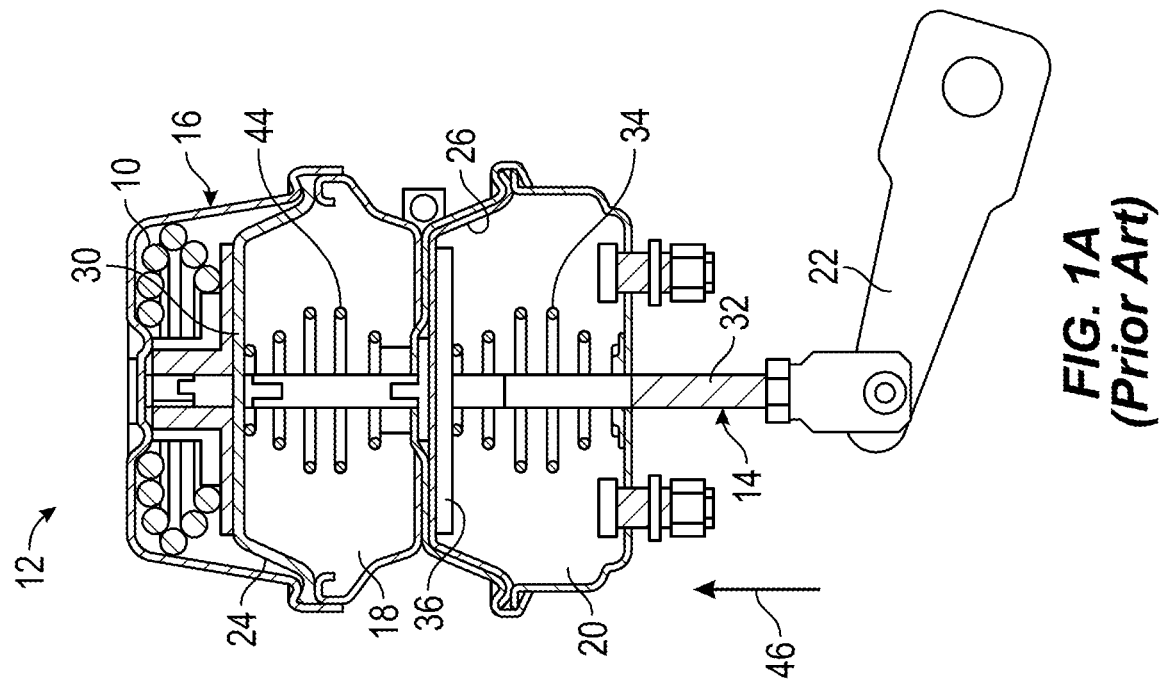
Figure 1C:
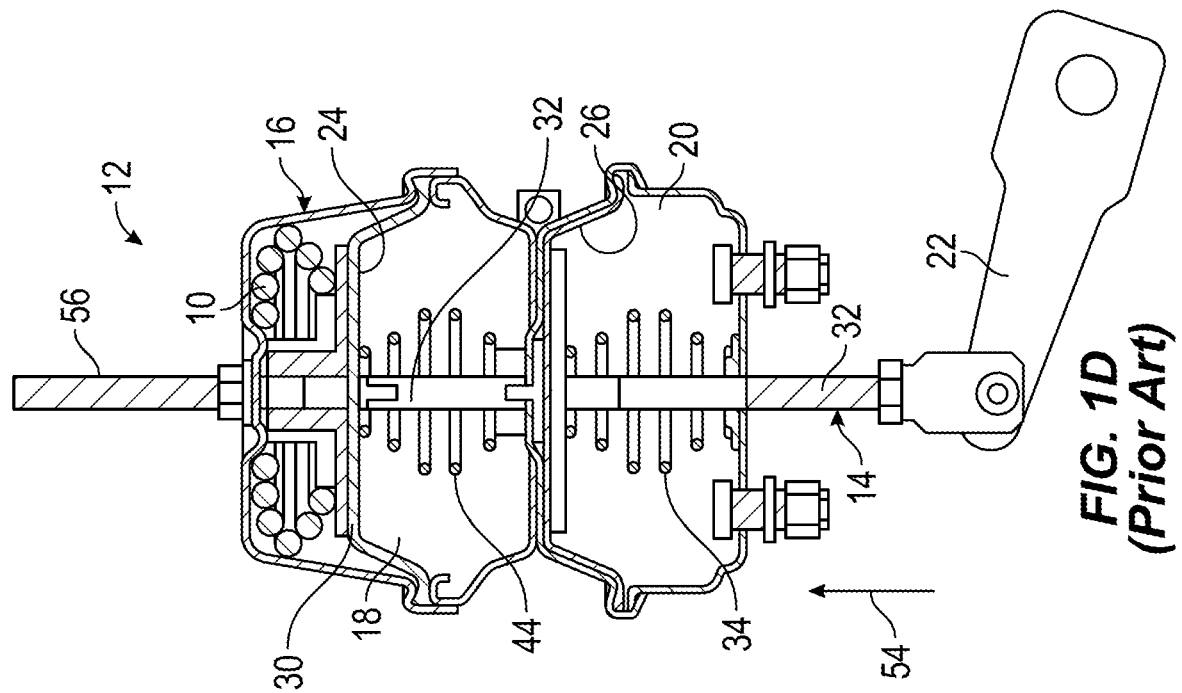
Figure 1D:
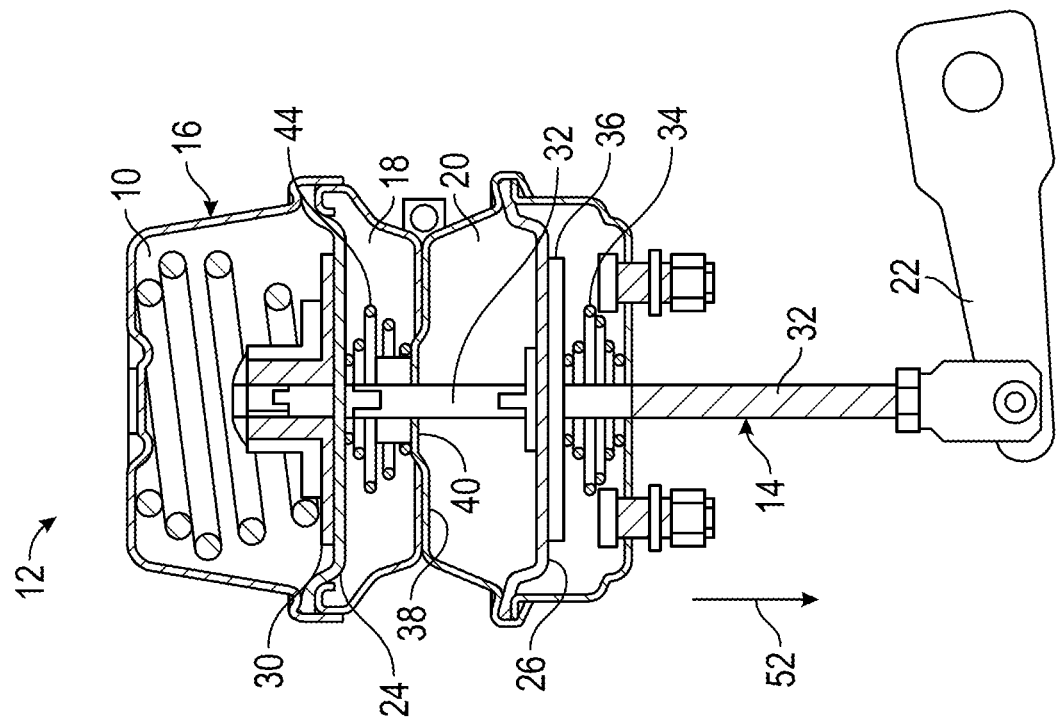

During operation, as illustrated in FIG. 1A, when parking brake chamber 18 is pressurized, the upper diaphragm 24, upper plate 30, push rod assembly 14, lower diaphragm 26 and lower plate 36, retract, as indicated by arrow 46. This causes main compression spring 10 to be compressed, while the upper and lower compression springs 34, 44 are extended. As a result, the wheel brake is released and the vehicle may be driven. Referring to FIG. 1B, when the vehicle driver presses down on the above-noted vehicle brake pedal, the service brake chamber 20 is pressurized. This cause the lower diaphragm 26 to move down and the compression spring 34 to be compressed. As a result, push rod assembly 14 is pushed outwardly relative to the service brake chamber 20, as indicated by arrow 48, and the wheel brakes are applied. FIG. 1C depicts a situation when the vehicle is off or air is otherwise evacuated from the spring brake actuator 12. When this occurs, air is absent from the parking and service brake chambers 18 and 20 and the main compression spring 10 pushes the push rod assembly 14 outward of the service brake chamber 20, in the direction of arrow 52, so that the wheel brakes are applied. As illustrated in FIG. 1D, the push rod assembly 14 can be retracted, see arrow 54, and the main compression spring 10 mechanically caged, through use of a release tool 56, so that the wheel brake can be released and the vehicle may be moved even though there is no air in the system.

Figure 2:
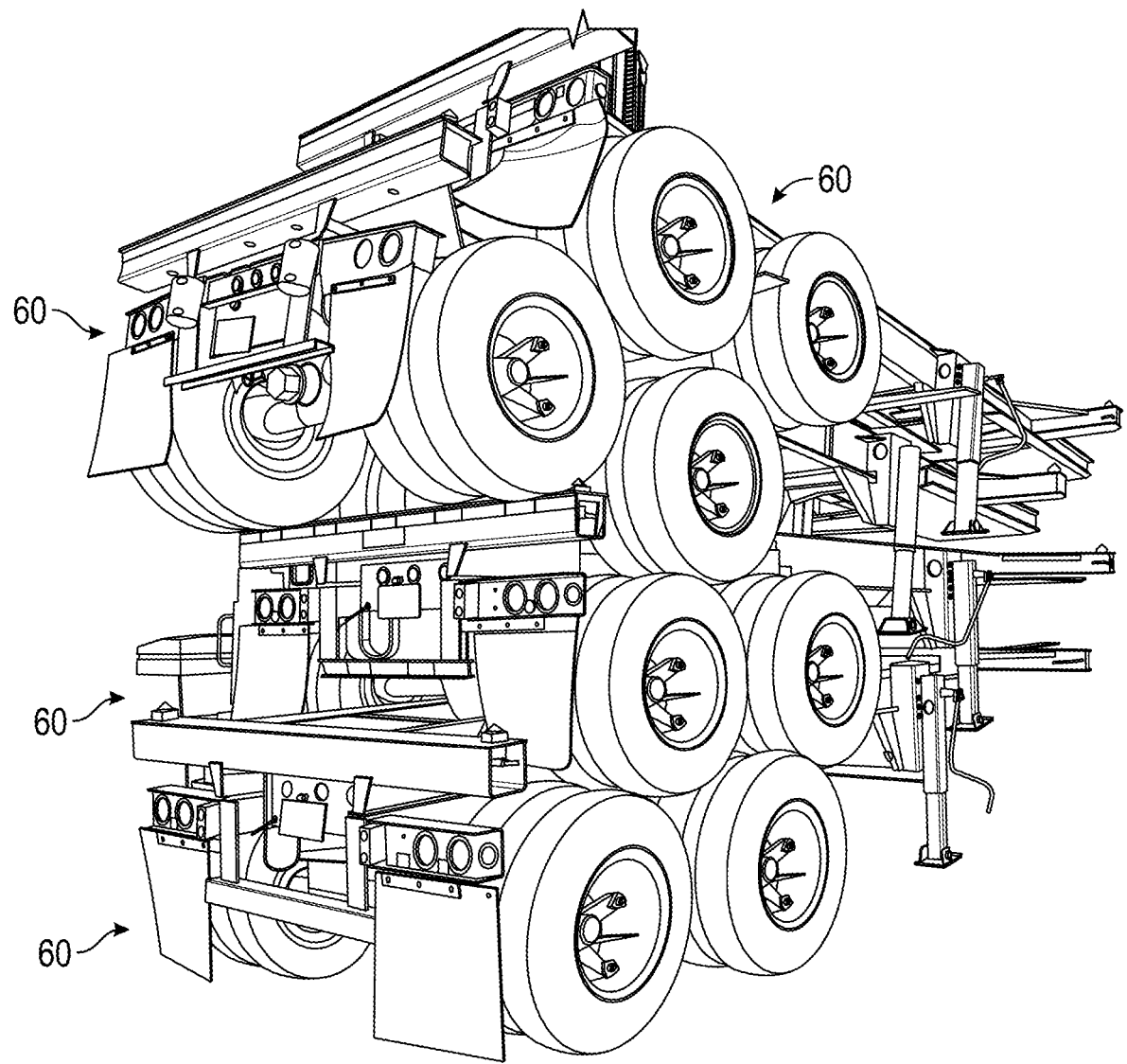
FIG. 2 depicts several trailer vehicles stacked on top of each other in a storage yard, as is conventional in the art.
Figure 3:
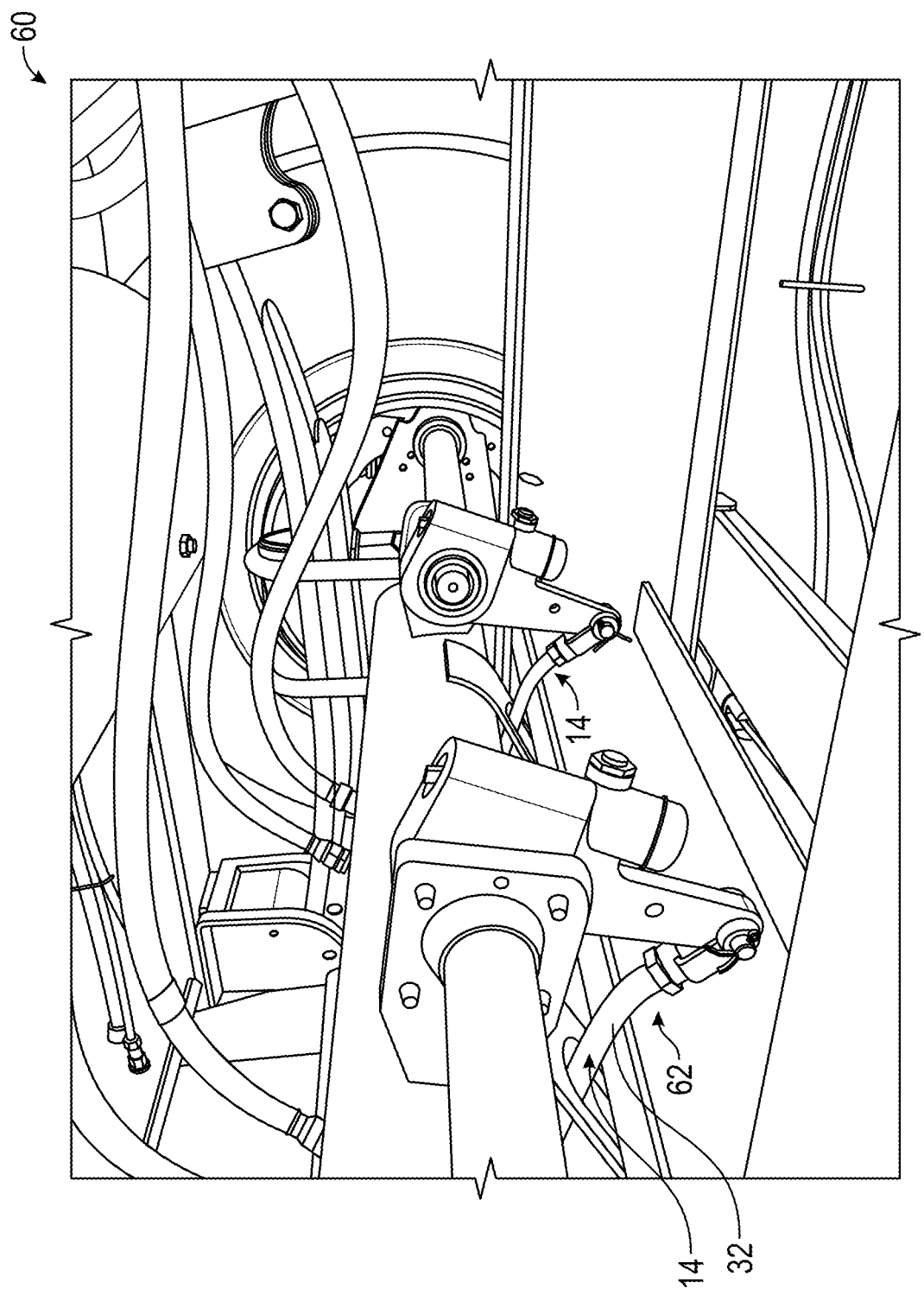
FIG. 3 depicts a fixed axle of a first one of the stacked trailer vehicles and a frame member of an underlying second one of the stacked vehicles, showing the push rods on spring brake actuators of the first one of the stacked trailer vehicles being engaged with and bent about the frame member of the underlying second one of the stacked vehicles.
Figure 4A:
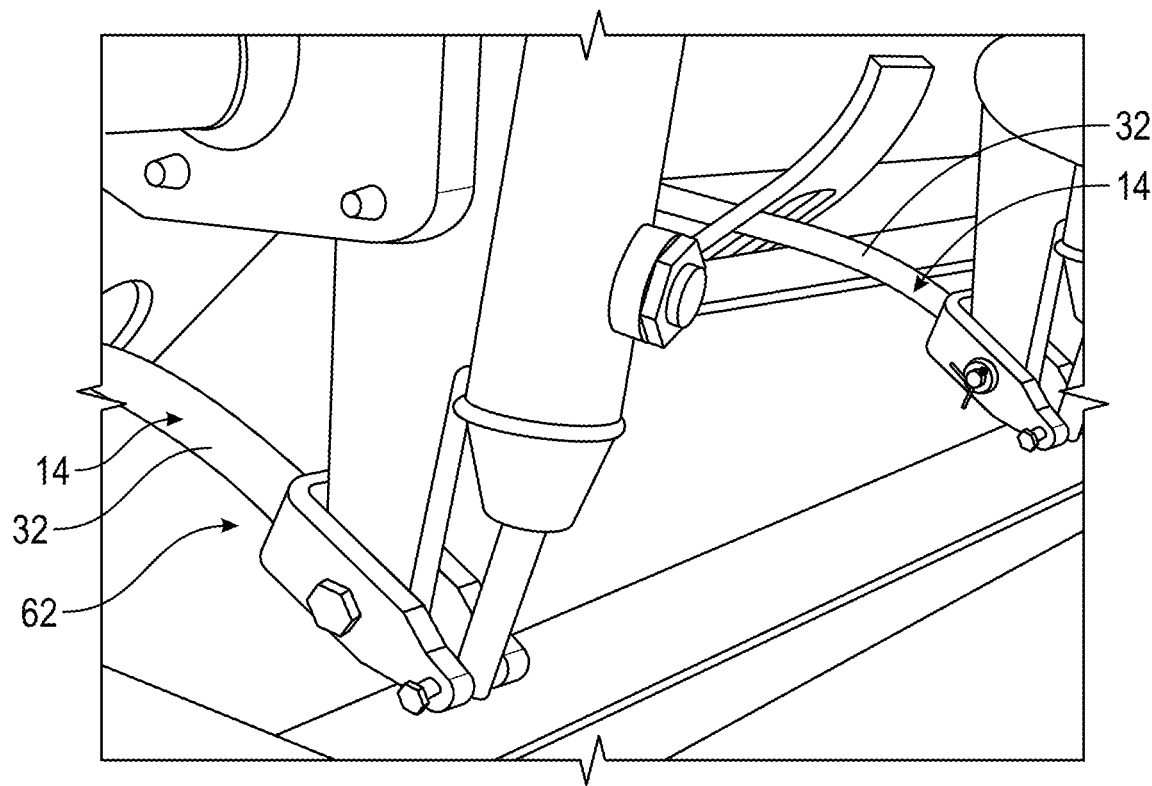
FIGS. 4A and 4B depict bent/damaged push rods, such as the ones shown in FIG. 3.
Figure 4B:
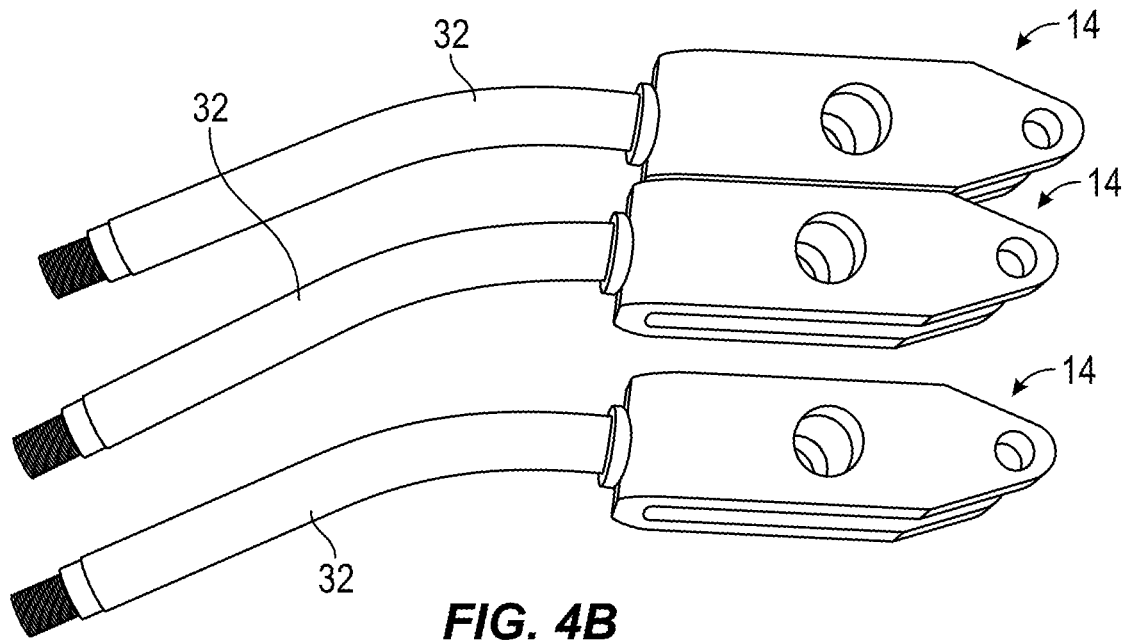

Through research and experimentation, the present inventors have determined that the push rod 32 can inadvertently become bent or broken during storage, transport and/or use of the spring brake actuator 12. Referring to FIGS. 2-4, it is common practice to store multiple vehicle trailers 60 in a stacked configuration, for example in a storage yard. In such a stacked configuration, the push rod assemblies 14 on an overlying trailer vehicle 60 can engage a laterally extending frame member 62 or an underlying vehicle trailer 60 such that the weight of the overlying trailer vehicle 60 causes the push rod 32 to bend about the frame member 62. This damages the push rod assembly 14 and renders it inoperable. FIG. 4B shows examples of push rods 32 that have been bent in this manner.

Through research and experimentation, the present inventors have also determined that changing a bent or broken push rod involves a complicated process of loosening the clamp hardware and then replacing the push rod. In a situation where the spring brake actuator is permanently sealed on the service side, replacing a bent or broken push rod typically requires replacement of the entire actuator. This is costly and time-consuming. Thus, the present inventors have determined that it is desirable to provide systems having spring brake actuators with push rod assemblies that can be more readily serviced and/or replaced in a less costly manner than the prior art.

Referring now to FIGS. 5-8, according to the present disclosure, a spring brake actuator 100 is uniquely configured such that a bent or broken push rod can be easily serviced and/or replaced with a new one, without requiring disassembly and/or replacement of the entire unit. The spring brake actuator 100 includes a housing 101 including a parking brake chamber 102 and a service brake chamber 104. Although not shown, the parking brake chamber 102 and service brake chamber 104 are configured similar to the conventional embodiment shown herein above in FIGS. 1A-1D. According to the present disclosure, a novel push rod assembly 105 has a base plate 106 disposed in the spring brake actuator 100 and a removable and replaceable push rod 108 extending out of the service brake chamber 104. Activation of the spring brake actuator 100 causes the push rod 108 to extend out of the service brake chamber 104 and to retract into the service brake chamber 104 (as described herein above).

Figure 7:
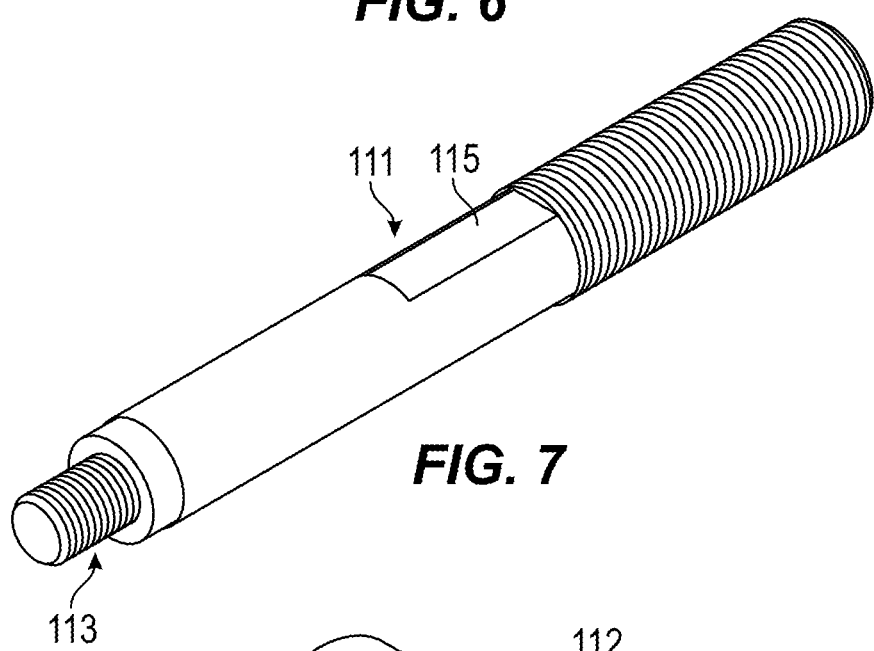
FIG. 7 depicts a second portion of the push rod according to the present disclosure.

The push rod 108 has a first end portion 109 that is fixedly coupled to the base plate 106 and a second end portion 111 that is removably coupled to the first end portion 109 such that the second end portion 111 is manually attachable and manually detachable from the push rod assembly 105. The type of coupling can vary from what is shown. In the illustrated example, the first end portion 109 is coupled to the second end portion 111 by a threaded joint 110. In this example, the first end portion 109 forms a stem having a central bore 121 with internal threads and the second end portion 111 has protrusion 113 with external threads that engage with the internal threads on the first end portion 109. As shown in FIG. 7, during use the first end portion 109 extends out of the service brake chamber 104, further enhancing user operability. Optionally the second end portion 111 of the push rod 108 can have flats 115 that facilitate manual gripping with the operator's fingers or a manual tool, such as a wrench.

Figure 5:
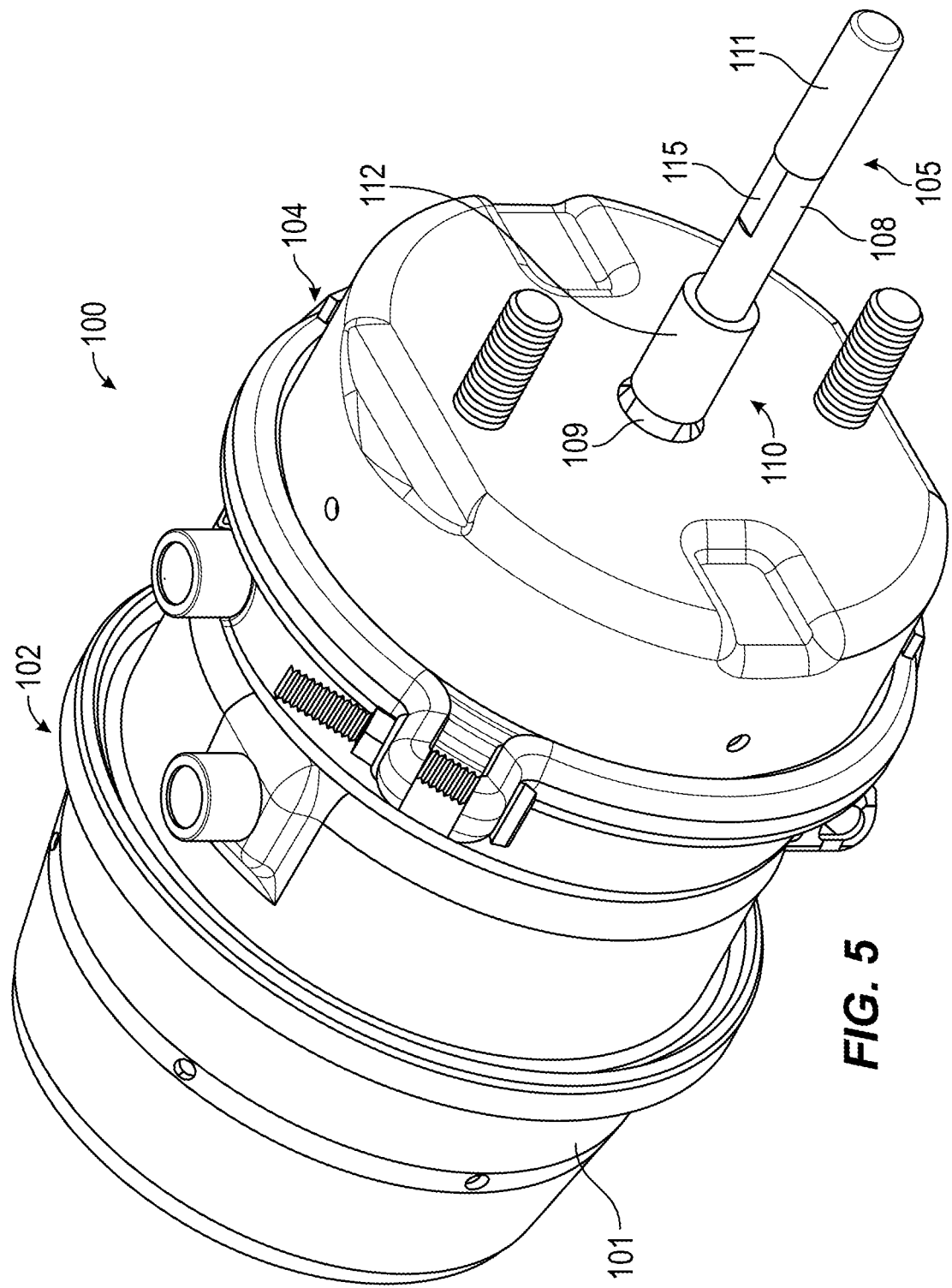
FIG. 5 depicts a spring brake actuator fitted with a replaceable push rod assembly according to the present disclosure.
Figure 6:
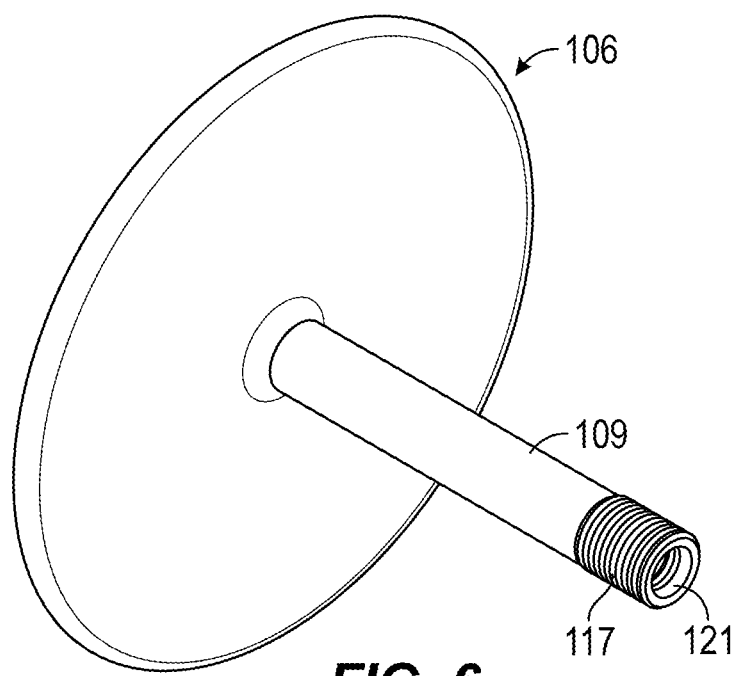
FIG. 6 depicts a push rod base plate and a first portion of a push rod according to the present disclosure.
Figure 8:
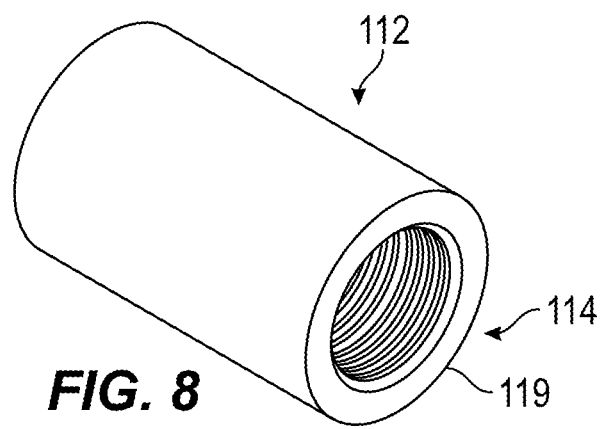
FIG. 8 depicts a support collar according to the present disclosure.

Referring to FIGS. 5 and 8, the push rod assembly can further include a support collar 112 that is coupled to the first end portion 109 of the base plate 106 and that covers and supports the joint 110 between the first and second end portions 109, 111 of the push rod 108. The manner in which the support collar 112 is coupled to the push rod 108 can vary from what is shown. In the illustrated example, the support collar 112 is coupled to the first end portion 109 of the base plate 106 by a threaded coupling. The first end portion 109 has external threads 117 that engage with internal threads 119 in a central bore 114 through the support collar 112. It should be understood that the present invention is not limited to the particular removable coupling shown and described. Different types of threaded couplings could be employed. Alternately, different types of removable couplings could be employed instead of a threaded coupling.

Figure 9A:
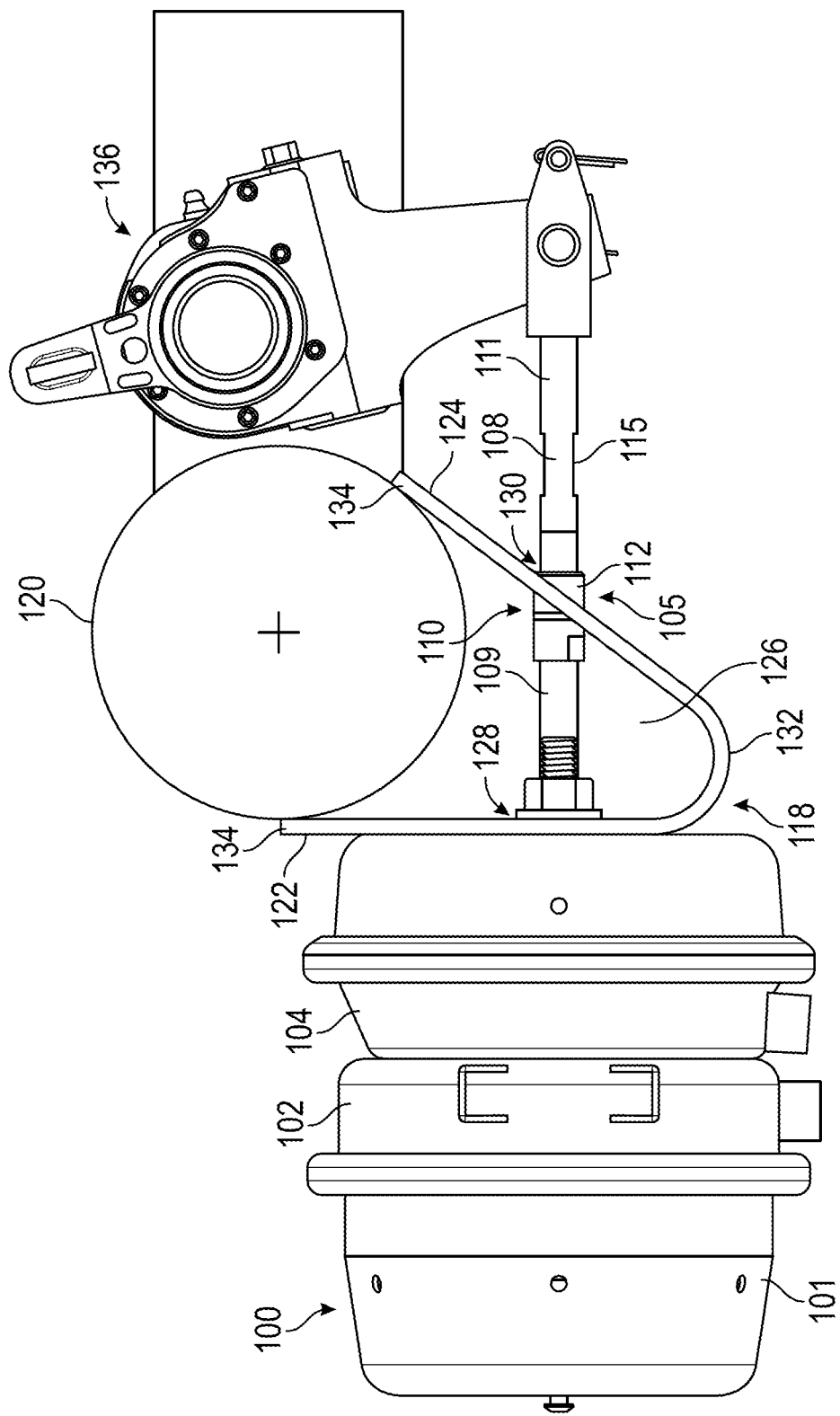
FIGS. 9A-9B depict an ideal location of the joint in the replaceable push rod according to the present disclosure.
Figure 9B:
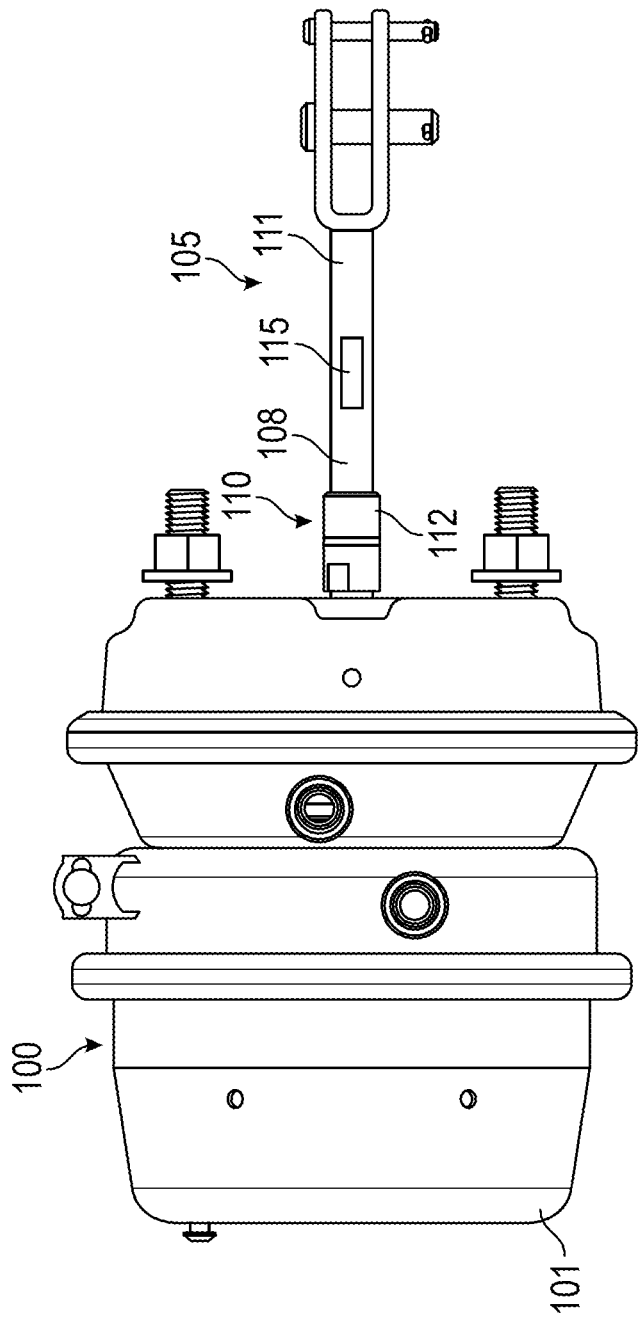

FIGS. 9A and 9B depict an ideal location of the joint between the first and second end portions 109, 111 of the push rod 108, and particularly as it relates to surrounding structures on a trailer vehicle 116. A mounting bracket 118 couples the spring brake actuator 100 to a stationary axle 120 of the vehicle. The mounting bracket 118 has a first end wall 122 that faces and is mounted to the service brake chamber 104 of the spring brake actuator 100 by, for example, fasteners, and a second end wall 124 that is spaced apart from the spring brake actuator 100 such that the first end wall 122 and the second end wall 124 together define an open interior 126 of the mounting bracket 118. The first end wall 122 has a hole 128 through which the push rod 108 extends and the second end wall 124 has a hole 130 through which the push rod 108 extends. As such, the push rod 108 extends through the entire mounting bracket 118 and through the interior 126 of the mounting bracket 118. The first and second end walls 122, 124 are attached to each other or formed together at the lower end 132 of the mounting bracket 118. Each of the first and second end walls 122, 124 has an upper end 134 that is fixed to an opposing side (respectively) of the stationary axle 120, such that the mounting bracket 118 has a generally triangular shape when viewed in cross section along the length of the stationary axle 120, as shown in FIGS. 8A and 8B. As explained herein above, a the second end portion 111 of the push rod 108 is attached to a conventional slack adjuster 136, which in turn is connected to a wheel brake for braking the wheel of the vehicle all as is conventional. The slack adjuster 136 and wheel brake are well-known items in the art and thus not further herein described.

As shown in FIGS. 9A and 9B, the joint 110 between the first and second end portions 109, 111 is located along the length of the push rod 108 at a position where the joint 110 will remain outside of the housing 101 of the spring brake actuator 100 and particularly outside of the service brake chamber 104. This advantageously allows the joint 110 to remain accessible for replacement of the second end portion 111 of the push rod 108 regardless of the position of the push rod 108, i.e. regardless of the operational state of the spring brake actuator 100 between the activated state (FIG. 9A) and the deactivated state (FIG. 9B).

FIG. 9A shows the spring brake actuator 100 in an activated state, wherein the push rod 108 is extended from the service brake chamber 104 so as to cause the slack adjuster 136 and associated wheel brake to apply a braking force on a wheel of the vehicle. In this state, the joint 110 between the first and second end portions 109, 111 of the push rod 108 remains inside or at least partially inside the interior of the mounting bracket 118. This example is particularly advantageous because it protects the first end portion 109 of the push rod 108 and the joint 110 from becoming bent or damaged when the vehicle is stacked on top of other vehicles in the manner shown in FIGS. 2 and 3. If the vehicles are stacked, and if the push rod 108 is damaged, the mounting bracket 118 will deflect the frame member 62 of the underlying vehicle trailer 60 so that damage to the push rod 108 will be limited to the second end portion 111 of the push rod 108, which as described above can be easily replaced via the removable connection at the joint 110.

In other examples, the mounting bracket 118 can have a simpler construction, for example omitting the second end wall 214. In these examples, it is preferable to design the push rod 108 such that during the full extent of travel of the push rod 108 during activation and deactivation, the joint 110 remains outside of the housing 101 but also at least partially or substantially beneath or on the same side of the stationary axle 120 as the service brake chamber 104, or optionally on the same side of the center axis thereof as the service brake chamber 104, thus protecting the first end portion 109 of the push rod 108 and the joint 110 from becoming bent or damaged when the vehicle trailer 60 is stacked on top of other vehicle trailers 60 in the manner shown in FIGS. 2 and 3.

Advantageously, the novel push rod assembly provides owner/operators of spring brake actuators with the ability to easily replace a bent or broken push rod, for example of an S-Cam type brake actuator. The push rod assembly also advantageously provides owner/operators with the ability to select one of a variety of different manually attachable push rods, depending on a particular application and/or performance requirement. The selected push rod can be mated with a stock spring brake actuator having the base plate. That is, each base plate can be configured to mate with a variety of different push rod models having, for example different lengths and/or other characteristics. Thus, the concepts disclosed herein advantageously alleviate the current need for the aftermarket provider to retain large numbers of different actuator chambers, each having different push rods, in inventory. Thus, both cost and time savings are provided.

In certain examples, the concepts disclosed herein optionally can be combined with the variable clocking (i.e., rotationally adjustable) technology disclosed and claimed in the above-incorporated U.S. Pat. No. 9,050,958, thus providing the owner/operators, manufacturers, and aftermarket providers with a wide variety of options when applying a particular brake actuator configuration to different braking systems. Another advantage of the disclosed embodiments is the ability to reduce the number of SKUs or part numbers. Different pushrod lengths typically require a separate part number and in turn shelf space at the distributor. With the concepts disclosed herein, the different there can be provided one unit and a box of rods to choose from. This saves the provider space and allows the manufacturer a greater ability to package more units in a box as the long rods are not getting in the way. In essence this creates the plug and play chamber.

It will thus be seen that the present disclosure provides a braking system for a vehicle comprising a spring brake actuator with a parking brake chamber, a service brake chamber, and a push rod assembly having a base located in the service brake chamber and a push rod coupled to the base and extending from the service brake chamber. Pneumatic activation of the spring brake actuator causes the push rod to further extend out of the service brake chamber to thereby engage a wheel brake with a wheel of the vehicle. Pneumatic deactivation of the spring brake actuator causes the push rod to retract back into the service brake chamber to thereby disengage the wheel brake from the wheel of the vehicle. The push rod extends between a first end portion that is fixed to the base and an opposite, second end portion that is removably coupled to the first end portion at a joint so that the second end portion is manually attachable and detachable from the push rod assembly. A mounting bracket couples the spring brake actuator to a vehicle. In certain examples, the push rod extends through the mounting bracket and wherein the joint is located along the push rod such that the joint remains outside of the parking brake chamber when the push rod is in the extended position and remains at least partially within an interior of the mounting bracket when the push rod is in the extended position. In certain examples, the joint between the first end portion and second end portion remains at least partially on a same side of the fixed axle with respect to the service brake chamber during movement of the push rod into and between the extended and retracted positions In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims.

What is claimed is:

1. A braking system for a vehicle, the braking system comprising:
    a spring brake actuator comprising:
        a parking brake chamber;

a service brake chamber; and
a push rod assembly having a base located in the service brake chamber and a push rod coupled to the base and extending from the service brake chamber;
wherein pneumatic activation of the spring brake actuator causes the push rod to further extend out of the service brake chamber to thereby engage a wheel brake with a wheel of the vehicle;
wherein pneumatic deactivation of the spring brake actuator causes the push rod to retract back into the service brake chamber to thereby disengage the wheel brake from the wheel of the vehicle; and
wherein the push rod comprises:
a first end portion that is fixed to the base and a comprises a stem with a central bore having a plurality of internal threads; and
a second end portion that is fixed to a slack adjuster and comprises a protrusion with a plurality of external threads and a plurality of grip surfaces situated between the slack adjuster and the protrusion;
wherein the plurality of external threads of the second portion couple to the plurality of internal threads of the first end portion at a joint so that the second end portion is manually attachable to and detachable from the push rod assembly by engaging the plurality of grip surfaces with an operator's fingers or a tool; and
a mounting bracket that couples the spring brake actuator to a vehicle;
wherein the push rod extends through the mounting bracket; and
wherein the joint is located along the push rod such that the joint remains outside of the service brake chamber when the push rod is in the extended position and remains within an interior of the mounting bracket when the push rod is in the extended position.

2. The braking system according to claim 1, wherein the mounting bracket comprises a first end wall that faces the spring brake actuator and a second end wall is spaced apart from the first end wall and the spring brake actuator, wherein the first end wall and the second end wall together at least partially define the interior of the mounting bracket.

3. The braking system according to claim 2, wherein the first end wall has a hole through which the push rod extends and wherein the second end wall has a hole through which the push rod extends, and wherein movement of the push rod from the retracted position to the extended position moves the joint closer to but not completely through the hole in the second end wall.

4. The braking system according to claim 3, wherein the first and second end walls are coupled to each other at a lower end of the mounting bracket.

5. The braking system 4, wherein the first and second end walls each have an upper end for coupling to a fixed axle of the vehicle.

6. The braking system according to claim 1, further comprising the wheel brake, wherein the wheel brake is coupled to the slack adjuster.

7. A method of servicing a braking system for a vehicle, wherein the method comprises:
providing a spring brake actuator coupled to a vehicle using a mounting bracket, the spring brake actuator comprising:
a parking brake chamber;
a service brake chamber; and
a push rod assembly having a base located in the service brake chamber and a push rod coupled to the base and extending from the service brake chamber, the push rod comprising:
a first end portion that is fixed to the base and comprises a stem with a central bore having a plurality of internal threads; and
a second end portion that is configured to be fixed to a slack adjuster and comprises a protrusion with a plurality of external threads, wherein the plurality of external threads of the second portion couple to the plurality of internal threads of the first end portion at a joint;
wherein pneumatic activation of the spring brake actuator causes the push rod to further extend out of the service brake chamber in a brake engagement direction to thereby engage a wheel brake with a wheel of the vehicle; and
wherein pneumatic deactivation of the spring brake actuator causes the push rod to retract back into the service brake chamber in a brake disengagement direction to thereby disengage the wheel brake from the wheel of the vehicle;
rotating the second end portion relative to the first end portion to decouple the second end portion from the first end portion, wherein the first end portion remains stationary and the second end portion moves in the brake engagement direction;
providing a replacement second end portion, wherein the replacement end portion is configured to be fixed to the slack adjuster and comprises a protrusion with a plurality of external threads; and
rotating the replacement second end portion relative to the first end portion to couple the external threads of the replacement second end portion to the plurality of internal threads of the first end portion, wherein the first end portion remains stationary and the replacement end portion moves in the brake disengagement direction.

8. The method of claim 7, wherein an overall length of the replacement second end portion is longer or shorter than an overall length of the second end portion.

9. The method of claim 7, wherein the second end portion further comprises a plurality of grip surfaces situated between the slack adjuster and the protrusion; and
wherein rotating the second end portion relative to the first end portion to decouple the second end portion from the first end portion comprises engaging the plurality of grip surfaces with an operator's fingers or a tool.

* * * * *